Aug. 3, 1937. H. S. BEST Re. 20,459

DISPLAY RACK

Original Filed June 15, 1931 2 Sheets-Sheet 1

Witness:
William P. Kilroy

Inventor:
Harry Sumner Best
Wm. O. Belk
Atty.

Aug. 3, 1937. H. S. BEST Re. 20,459

DISPLAY RACK

Original Filed June 15, 1931 2 Sheets-Sheet 2

Witness:
William P. Kilroy

Inventor:
Harry Sumner Best
By Wm O. Belk
Atty.

Reissued Aug. 3, 1937

Re. 20,459

UNITED STATES PATENT OFFICE 20,459

DISPLAY RACK

Harry Sumner Best, Geneseo, Ill., assignor, by mesne assignments, to John H. Best & Sons, Inc., Galva, Ill., a corporation of Illinois Original No. 1,899,935, dated March 7, 1933, Serial No. 544,347, June 15, 1931. Application for reissue June 15, 1937, Serial No. 148,419

6 Claims. (Cl. 211—45)

This invention relates to display racks and more particularly to a display rack adapted to be used in displaying rugs, carpets, wall paper and the like, but the invention will be described herein as it is used in the display of rugs.

Formerly when a display rack was used to display rugs it was customary to throw one rug back over another for purposes of display to the prospective purchaser. In the event it was desirable to remove a particular rug because it was discontinued or for other reasons, it was necessary to disturb all of the rugs positioned above the rug to be removed.

One of the objects of the invention is to provide a display rack on which rugs may be displayed and from which any rug may be removed without the necessity of disturbing the remaining rugs.

Another object of the invention is to provide a portable rack having a rigid and adjustable fastening device for fastening the rugs thereto.

And a further object is to provide a rack on which rugs may be displayed on both sides thereof.

Other objects of the invention will be apparent from the following description.

A selected embodiment of the invention is illustrated in the accompanying drawings in which Fig. 1 is a perspective view of the display rack forming my invention.

Figure 1:
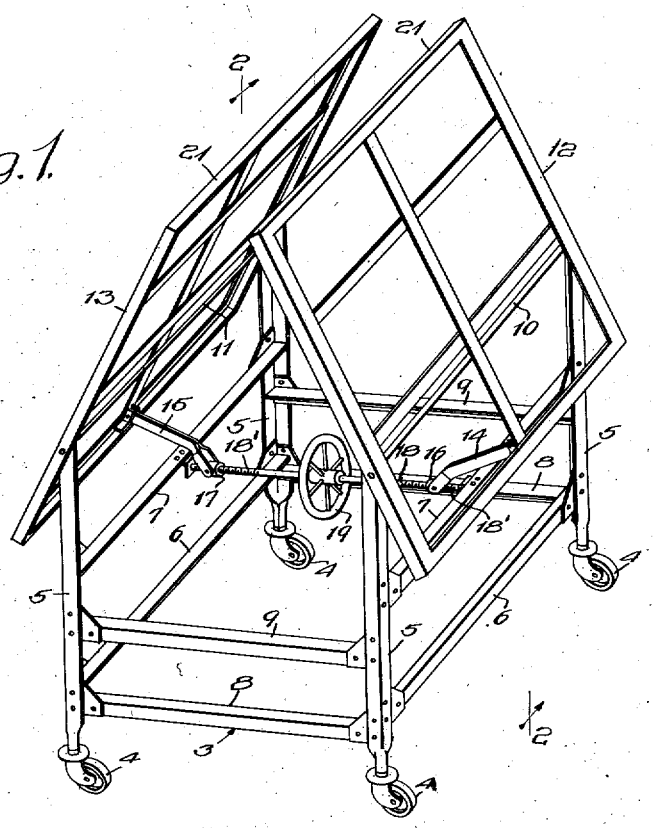
Figure 2:
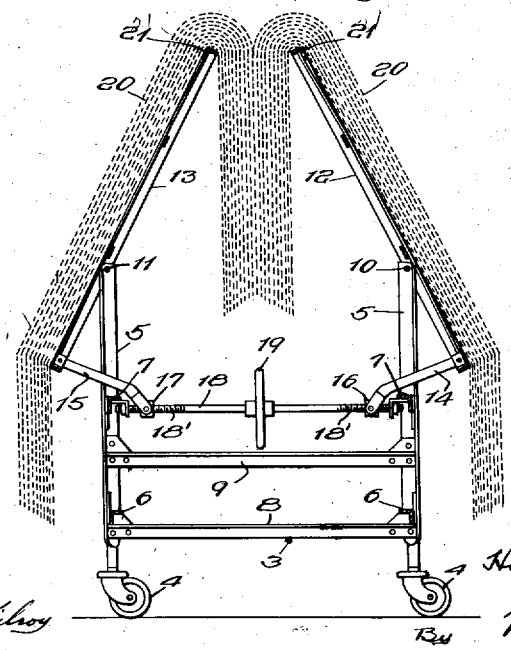
Fig. 2 is a sectional view taken substantially on the plane of the designation 2—2 of Fig. 1.

Referring to Figs. 1, 2, a rectangular frame 3 is mounted on casters 4 and comprises vertical corner posts 5 interconnected by bars 6 and 7 on the sides and bars 8 and 9 on the ends. Pivot rods 10 and 11 are mounted in the upper end of the vertical corner posts 5 and extend along the sides of the device. The ends of the rods pass through and extend slightly beyond the corner posts. Supports 12 and 13 are pivotally mounted on the extensions of rods 10 and 11 respectively, below the longitudinal center line of said supports. Links 14 and 15 respectively connect the lower parts of the supports 12 and 13 to nuts 16 and 17 mounted on right and left threaded portions 18′ of the shaft 18 which is journaled in the frame. When the shaft is rotated by operation of the hand wheel 19, the nut 16 will move in one direction and the nut 17 will move in the opposite direction and these nuts will actuate the links to swing the supports inwardly or outwardly.

In operation, the upper ends of the supports are opened or spread apart by turning the hand wheel 19 in one direction to draw the links inwardly and swing the frames about the pivot rods 10 and 11. Preferably two groups of rugs 20, facing in opposite directions, are draped over the parallel clamping bars 21 at the top of the supports and then the hand wheel is turned in the opposite direction to swing the supports to closed position with the rugs securely clamped between the clamping bars to prevent displacement. If it is desired to remove a particular rug for any reason, the rugs lying on top of it are thrown over the other support and the supports are then spread apart and the rug removed, after which the supports are clamped together again to hold the remaining rugs in place. It is obvious that new rugs may be installed in the rack by a similar operation. Another desirable feature of the invention is that it will display rugs at either side of the rack and the backs of the rugs are always more or less concealed. This is of special importance when the rugs are not being displayed to a customer because customers passing by the rack on either side thereof will see the face of a rug.

Figure 4:
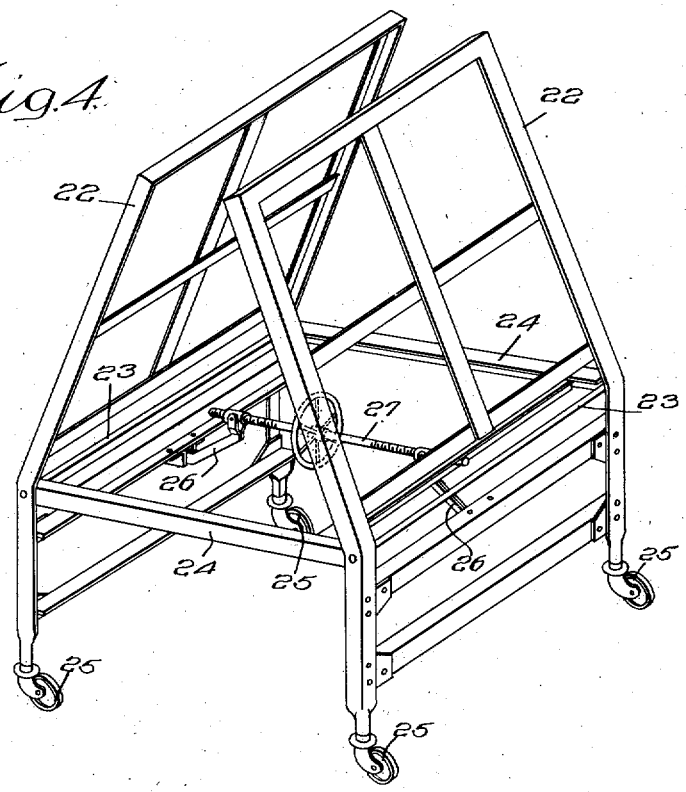
Fig. 4 is a perspective view on a reduced scale of the modified form.
Figure 3:
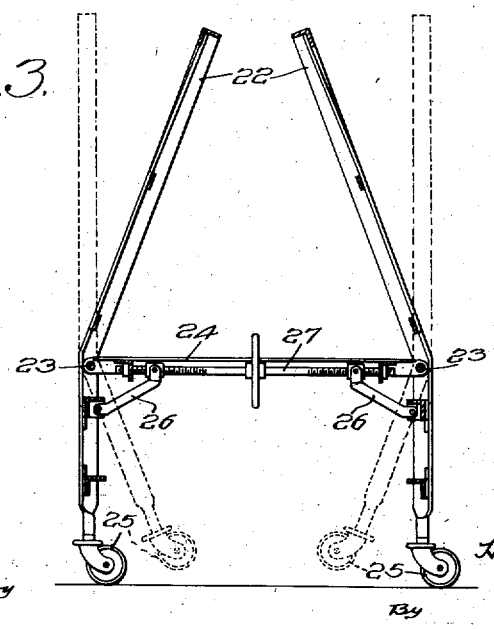
Fig. 3 is an elevation on a reduced scale of a modified form of my invention.

In Figs. 3 and 4, I have shown another embodiment of the invention in which the supports 22 are pivotally mounted at 23, preferably below their longitudinal center line, to a frame 24 and are provided with fixed wheels 25 at their lower ends. The links 26 of the threaded shaft adjusting and holding means 27, are pivoted to the supports below the pivots 23 and the supports are swung inwardly and outwardly by operating said means as previously described.

While I have illustrated and described selected embodiments of my invention, it is to be understood that it is capable of variation and modification without departing from the scope thereof as set forth in the following claims:

I claim:

1. A display device for rugs and the like comprising a pair of oppositely disposed supports providing outwardly disposed supporting areas adapted to receive articles to be displayed and having cooperating clamping edges, said supports having corresponding ends thereof rested on a supporting member, a frame, means pivotally connecting the supports to the frame, and means for uniformly adjusting said supports on said supporting member and relative to each other to clamp articles rested on said supporting areas and having portions arranged between the clamping edges of said supports.

2. A display device for rugs and the like comprising a frame, a pair of oppositely disposed supports providing outwardly disposed supporting areas adapted to receive articles to be displayed, means pivotally connecting the supports to the frame, and operating means for uniformly and simultaneously moving said supports relative to each other into clamping and receiving positions and adapted to hold the supports in either of said clamping or receiving positions.

3. A display device for rugs and the like comprising a frame, a pair of oppositely disposed supports pivotally mounted on the frame and having coacting clamping portions thereon, a shaft having oppositely threaded portions mounted in the frame, means connecting said supports to said threaded portions, and means for operating the shaft to clamp the supports on rugs draped thereover.

4. A display device for rugs and the like comprising a rectangular frame, upwardly projecting corner posts on the frame, oppositely disposed supports pivotally connected between the top and bottom thereof to said posts, and means on the frame below said pivotal connections and connected with the lower portions of the supports for moving the supports to clamp rugs draped thereon.

5. A display device comprising a frame, a pair of supports pivotally mounted on said frame and having parallel coacting clamping edges at the top thereof, means for simultaneously swinging said supports to move said clamping edges toward or away from each other, and means connecting said supports to said moving means.

6. A display device comprising a frame, a pair of supports pivotally mounted on said frame and having coacting clamping portions thereon, a right and left threaded shaft rotatably supported in the frame, nuts on the threaded portions of the shaft, and link means connecting said nuts to said supports to move said supports relative to each other when the shaft is rotated to clamp the supports on rugs draped thereover.

HARRY SUMNER BEST.